United States Patent Office 3,019,277
Patented Jan. 30, 1962

3,019,277
THERMAL INSULATED COMBUSTION CHAMBERS
Thomas P. Rudy, Orinda, Calif., assignor to Shell Oil Company, New York, N.Y., a corporation of Delaware
No Drawing. Filed Dec. 30, 1960, Ser. No. 79,539
5 Claims. (Cl. 123—191)

This invention relates to new and useful improvements in spark ignition internal combustion engines and more particularly to improved spark ignition internal combustion engines having high compression ratios.

It is generally accepted that the efficiency of an internal combustion engine can be improved by increasing the compression ratio. This relationship of high compression ratio to increased efficiency is fundamental in the development of more efficient engines having good performance characteristics. While the efficiency of the spark ignition internal combustion engine can thus be increased, in practice it has been found that a serious limitation is imposed by combustion chamber deposits which accumulate in high compression engines. Engine malfunctioning due to these combustion chamber deposits results in certain abnormal combustion chamber phenomena at compression ratios of about 8.5:1 and higher. A particularly troublesome combustion phenomenon, commonly referred to as "rumble," is a result of surface ignition. Today rumble looms as a formidable barrier to the design of efficient engines with high compression ratios.

Rumble is a low frequency engine vibration set up by an unduly rapid rise in combustion chamber pressure and is characterized by a low pitched rapping noise in the range of approximately 600 to 1200 cycles per second. Generally, rumble is a very loud, harsh noise and in severe cases migh be compared to the noise from loose connecting rod bearings. It is most likely to occur at high engine speeds and loads such as may be encountered in passing or hill climbing. Rumble is objectionable not only because it poses a barrier to higher compression ratios and higher engine efficiency, but also it is the product of an abnormal combustion process which cannot be controlled without resorting to methods such as the following: (a) use of special fuels, e.g., highly paraffinic gasoline, (b) periodic mechanical or chemical treatment of the combustion chamber to remove deposits, and (c) operation of the engine at reduced speed or reduced power output. Moreover, the incidence and severity of rumble increase as compression ratio increases, thereby suggesting that rumble is a function of higher temperatures and pressures which result from increased compression ratio. Other factors contributing to rumble include: highly aromatic fuel, high speeds and particularly the presence of more than one point of ignition or flame front, i.e., the occurrence of surface ignition.

It is known that, in gasolines containing organo-metallic antiknock additives such as tetraethyllead (e.g. "leaded" gasoline), phosphorus fuel additives are highly effective in reducing the tendency of combustion chamber deposits therefrom to ignite the fuel-air mixture (surface ignition). Phosphorus provides excellent control of surface ignition by converting certain metal compounds (residues from combustion of the organo-metallic antiknock agents) to phosphates, which have a markedly reduced tendency to catalyze the combustion of carbonaceous residues, and it has generally been found that phosphorus fuel additives will reduce rumble tendencies in high compression engines. Nevertheless, rumble often occurs in the very high compression engines which are appearing in the newer automobiles, even when these engines are operated on gasoline containing a phosphorus additive.

It is therefore an object of the present invention to extend the effectiveness of phosphorus fuel additives in high compression ratio, spark ignition, internal combustion engines. It is a further object to provide a novel, more efficient, high compression spark ignition internal combustion engine which can be operated with gasoline fuels containing an organo-metallic antiknock additive and a phosphorus compound and/or lubricating oils containing a phosphorus compound. Another object is to provide a novel spark ignition engine combustion chamber for use with lubricating oils containing phosphorus compounds and/or with leaded gasoline containing a phosphorus compound. Another object is to provide a novel method of operating a spark ignition internal combustion engine. A still further object is to provide internal combustion engines with increased compression ratios which are not limited by abnormal combustion phenomena. Other objects will be apparent hereinafter.

It has now been discovered that rumble is uniquely related to certain deposits on combustion chamber surfaces. It has been found that by applying a controlled thermal insulation as herein defined to certain combustion chamber components, surface ignition phenomena, including rumble, can be controlled. Further, it has been found that a combustion chamber so coated will substantially eliminate rumble or at least minimize surface ignition to such an extent that rumble no longer is a material consideration in engine operations, when the engine is operated on fuels containing organo-metallic antiknock additives and phosphorus additives. Quite unexpectedly, this outstanding advantage is obtained without increasing the equilibrium octane requirement and without reducing power output of the engine.

It has now been discovered that, while phosphorus provides excellent control of surface ignition which occurs on the surface and in upper layers of combustion chamber deposits, it is not so effective in preventing the accumulation of highly carbonaceous, more readily ignitable materials in the lower layers of the deposits, i.e., near the metal surfaces.

A series of tests conducted in a 10.6:1 compression ratio, laboratory engine demonstrated this. The engine was a single cylinder adaptation of a modern V-8 automotive engine with cast wedge combustion chamber configuration. The base lubricant for these experiments was a commercial ash-free SAE 10W–30 oil. The fuel consisted of 65% v. catalytic reformate and 35% v. catalytically cracked gasoline and had a Research octane number of about 100 at 3.18 grams of lead per gallon as TEL (as Motor Mix). The engine test cycle is given in Table I and results of these tests are set forth in Table II.

TABLE I
*Engine cycle*

| Condition | Time, sec. | Air/Fuel ratio | Air Consumption, lbs./hr. | Spark Advance, ° BTC | R.p.m. | Indicated Mean Effective Pressure, p.s.i. |
|---|---|---|---|---|---|---|
| Idle | 50 | 8.6 | 7 | 37 | 1,775 | 17 |
| Cruise | 70 | 12.0 | 30 | 37 | 1,820 | 80 |
| Full Throttle (every half hour) | 30 | 11.5 | 80 | 15 | 1,870 | 158 |

Mixture temperature was controlled at 125° F. and water jacket temperature at 155° F.

TABLE II

| Test Number | I | II | III |
|---|---|---|---|
| Fuel phosphorus | none | 0.3 theory tricresyl phosphate. | 0.3 theory tricresyl phosphate. |
| Mixed alkyl aryl phosphates [a] added to lubricant (10.9% w. phosphorus). | none | none | 2.5% w. |
| Equivalent miles | 7,200 | 5,600 | 5,000. |
| Thickness of ignitable layer of deposit (mils). | ca 2 | ca 4 | ca 6. |
| Lowest deposit ignition temperature, °F.[b] | 1,240 | 950 | 980. |
| Rumble | heavy | medium | none. |

[a] Approximate composition: 50% w. methyl diphenyl phosphate, 45% w. dimethyl phenyl phosphate, and 5% w. triphenyl phosphate.
[b] Ignition temperatures of deposit samples were determined using a specially constructed electrical heater with attached thermocouple. The system was designed to have very low heat capacity. Ignition temperature was determined by placing a sample of deposit on the heater and increasing the temperature of the latter at a uniform rate of 1,000° F./min. as indicated by a recording potentiometer attached to the thermocouple. Ignition of the deposit sample was evident by an abrupt positive deviation of the temperature vs. time record. The temperature at which this deviation began was taken as the ignition temperature.

When the phosphorus additive was included in the lubricating oil (Test III above), rumble and wild ping were almost completely controlled for 5,000 miles; however, continued operation resulted in sporadic bursts of severe surface ignition. In an entirely different multi-cylinder engine test series, simulating metropolitan passenger car service, this effect occurred in less than 5,000 miles.

Quite unexpectedly, it was found that if the metal surfaces of various combustion chamber components are coated with an insulator of appropriate thickness and thermal conductivity, the formation of highly ignitable lower deposit layers is avoided when phosphorus is used in the gasoline and/or the lubricating oil. The deposits which do form correspond essentially in composition and properties to the upper deposits conventionally accumulated in an untreated combustion chamber in the presence of phosphorus. That is, it was discovered that, by using an insulating material having certain thermal conductivity properties, the lower deposits in effect are eliminated leaving only deposits which are rendered innocuous by the addition of phosphorus.

The single cylinder engine used in the tests described in relation to Table II above was treated as follows: That part of the cylinder head exposed to the combustion chamber (hereinafter referred to simply as cylinder head), the piston crown and the intake valve head were coated with a layer of zirconium oxide (12 to 14 mils thick). The base test was performed with an uncoated combustion chamber, the same base fuel and lubricating oil discussed with respect to Table II were used. The results are set forth below in Table III.

marked increase in octane requirement would loom as a significant deterrent to correcting rumble phenomena by means of insulating various combustion chamber components. Moreover, improved cooling of the combustion chamber to control octane requirement is fundamental in modern engine design. Deliberate insulation would appear inconsistent with this principle. However, quite unexpectedly, it was discovered that with equilibrium combustion chamber deposits, the octane requirement of the uncoated engine was 96.0 whereas the equilibrium octane requirement of the treated engine was 95.5. Furthermore, the improved rumble performance was gained without sacrifice of power output. Such benefit, however, can be obtained only if the thermal conductance of the coating is controlled carefully to fall within a very special range.

Under similar test conditions described in relation to Table I above the piston crown of the single cylinder engine was coated with a 5 mil layer of zirconium oxide, and compared with a base test wherein the piston crown was not insulated. The cylinder heads and valves of both engines were cleaned at similar intervals which eliminated surface ignition arising from deposits on these surfaces. At 9600 equivalent miles the engine with the untreated piston crown had an average rumble rate of 20 counts per hour whereas the engine with the 5 mil zirconium oxide coating at 9600 equivalent miles had an average rumble rate of 4.5 counts per hour.

The thermal conductance of the insulating coatings of this invention are from about 130 B.t.u./hr./sq. ft./° F. to about 5000 B.t.u./hr./sq. ft./° F. For example, a 12 mil coating of zirconium oxide, having a thermal conductivity of 7 B.t.u./hr./sq. ft./°F./in., has a thermal conductance of about 580 B.t.u./hr./sq. ft./° F. In a preferred embodiment of the invention the insulating coating has a thermal conductance from about 500 to about 1000 B.t.u./hr./sq. ft./° F.

Various conventional methods of applying the controlled thermal insulation to the combustion chamber components can be employed. The insulating material of the invention is an inert coating of low thermal conductivity, preferably a ceramic type material with high resistance to thermal shock. While thermal conductance is a necessary criterion, the thickness used is important by itself too. Thickness of the coating should be from about 0.5 to about 20 mils and preferably 5 to 15 mils, with the optimum thickness within this range being determined by engine design and the thermal conductivity of the particular coating material employed. The coating materials encompassed by this invention display cohesive and adhesive properties sufficient to avoid fracturing or peeling during engine operation. In general, the coating preferably also has the following additional properties and characteristics:

A. High melting point
B. High hardness

TABLE III

| | Insulation of Combustion Chamber | Compression Ratio | Test Duration | Average Rumble rate at conclusion of Test [a] | Octane Requirement (Initial) | Octane Requirement (Final) | Octane Requirement Increase | Full Throttle Indicated Mean Effective Pressure at Conclusion of Test, p.s.i. |
|---|---|---|---|---|---|---|---|---|
| Test IV | none | 9.75 : 1 | 11,740 equivalent miles. | 55 (counts per hour). | 90.0 | 96.0 | 6 | 150 |
| Test V | ZrO₂ (12–14 mils). | 9.75 : 1 | 12,080 equivalent miles. | 4 (counts per hour). | 91.5 | 95.5 | 4 | 151 |

[a] Cylinder pressure was sensed by a piezoelectric transducer. The resulting pressure-time signal was differentiated electronically to give a signal proportional to the rate of pressure change ($dP/dt$). An amplitude discriminator recorded the number of combustion cycles in which the maximum rate of pressure increase exceeded 140% of that obtaining in a normal combustion cycle at full throttle. Rumble rate is expressed as the average number of cycles per hour with $dP/dt$ greater than 140% of normal.

It is noted that insulating the various combustion chamber components results in a small but immediate increase in octane requirement, i.e., the ONR of the clean uncoated engine was 90.0 whereas the ONR of the clean treated engine was 91.5. At first glance this C. Relatively inert chemically
D. Good mechanical strength
E. High corrosion resistance
F. Low coefficient of thermal expansion, and
G. Low thermal conductivity A wide variety of refractory type oxide coatings can be employed. For example, the oxides of zirconium and chromium display the requisite insulating properties. In addition oxides of titanium, cerium and manganese and certain phosphates, silicates, fluorosilicates, and oxyhalides of these materials can also be employed with the thermal conductance limitations set forth above.

A conventional method of applying these coatings is a flame spraying type operation, wherein, the coating material is melted in a flame gun and sprayed on the surface to be coated.

It was found that finely ground zirconium oxide has no significant effect on the ignition temperature of deposit samples taken from an uncoated engine, thereby showing that catalytic activity is not a necessary property of the insulating coating. Moreover, the thermal insulating coatings of the invention do not affect the cycle temperatures except at very early stages of deposit formation. Further, the cycle temperatures of the engine are virtually unchanged relative to an untreated engine at equilibrium deposit conditions. In addition the coating does not affect engine lubrication or the quilibrium volumetric efficiency of the engine.

Depending upon the engine design and the thermal conductivity of the material employed as a coating, the various combustion chamber components, namely the cylinder head, intake valve and piston crown, could be coated at varying thicknesses to obtain optimum results. For example, in a single-cylinder laboratory engine, it is preferred that the thickness at the periphery of the piston crown be approximately 8 mils whereas the thickness of the coating at the center of the crown can be approximately 6 mils. With the head and intake valve having about an 8 mil coating, the exhaust valve can tolerate coatings in the 1 to 2 mil range. However, a preferred embodiment is to have the exhaust valve uncoated. In a further preferred embodiment of the invention, the various combustion chamber components are coated prior to their assemblage in the engine. To obtain the benefits of the invention it is necessary that at least a substantial proportion of the total surface of the combustion chamber be coated, preferably at least about 25%, and more especially at least about 50%. It is particularly preferred that at least about 85% of the combustion chamber be coated.

At equilibrium deposit conditions, the thermal behavior of the herein defined combustion chamber is indistinguishable from that of an untreated engine. The present invention does not avoid altogether combustion chamber deposits, rather it tolerates certain types of deposits while avoiding the formation of others so as to eliminate rumble in high compression engines without increasing octane requirement at deposit equilibrium and without requiring special fuels, periodic mechanical and chemical treatment of the combustion chamber or sacrifice of power output. Moreover, if the particular high compression engine has an octane requirement which is surface ignition limited, a marked reduction in octane requirement can be obtained.

The present invention is operative in all spark ignition internal combustion engines including four-cycle and two-cycle engines. Moreover, the thermal insulation concept is equally effective in air-cooled and water-cooled systems. The various components which are coated are made of the conventional metals used in internal combustion engines, i.e., aluminum, steel, cast iron and the like.

The phosphorus can be introduced into the combustion chamber as a constituent of the gasoline, as a volatile constituent of the crankcase lubricating oil or as a constituent of both the gasoline and the lubricating oil. The phosphorus concentration in gasolines containing organo-metallic antiknock additives can range from about .00002% to about .03% by weight.

When introduced as an additive in a gasoline containing an organo-lead antiknock agent, the phosphorus can be present in concentrations from about 0.01 to about 2.0 theories and preferably between about 0.05 and about 0.5 theory. A particular desirable composition contains about 0.3 theory of the phosphorus compound. A theory of phosphorus is defined as the amount of phosphorus theoretically required to react with the lead to form lead orthophosphate, namely two atoms of phosphorus for every three atoms of lead. Thus one theory of phosphorus denotes a phosphorus-to-lead atom ratio of 2:3. Therefore, the foregoing range of from about 0.05 to 0.5 theory of phosphorus corresponds to a phosphorus-to-lead atom ratio of from about 0.1:3 to 1:3.

Various volatile phosphorus compounds such as dimethylxylyl phosphate can be employed as the additive in crankcase lubricating oils in concentrations from about .001 to about 0.2% w. phosphorus. It is preferred for the purposes of this invention that the phosphorus compound contain at least 1% w. phosphorus and preferably at least about 5% w. phosphorus.

Various mineral oils in the lubricating oil range boiling from 350 to 800° F. and having a viscosity of from about 40 SUS at 100° F. to about 110 SUS at 210° F. can be employed. A preferred oil is a mineral oil containing only non-ash-forming additives.

The following are a few examples of suitable phosphorus compounds which can be used in the practice of the present invention: tri(alkaryl) phosphorus compounds such as tri-(2,5 dimethylphenyl) phosphate (Bame et al., U.S. 2,889,212, June 2, 1959), dimethyl aryl phosphates such as dimethyl xylyl phosphate (Orloff et al., U.S. 2,948,599, August 9, 1960), diaryl phosphoramidates such as dixylyl phosphoramidate (Larson, U.S. 2,948,600, August 9, 1960); other phosphorus compouuds such as disclosed in Orloff et al., U.S. 2,929,833, March 22, 1960; De Witt, U.S. 2,862,801, December 2, 1958; Orloff et al., U.S. 2,870,186, January 20, 1959; Kolka, U.S. 2,866,808, December 30, 1958; Orloff et al., U.S. 2,911,-431, November 3, 1959, can also be used according to this invention.

According to the present invention, spark ignition internal combustion engines having compression ratios of up to about 14:1 can be efficiently operated without the advent of rumble. Since the rumble problem begins to be quite serious at compression ratios upward of 9:1, the engines of the invention having at least such compression ratios are especially beneficial. Moreover, since the various surface ignition phenomena can be controlled by the present invention, the total antiknock quality available in a fuel can be utilized for efficiency improvement (e.g. by spark advance) because the octane reserve formerly necessary to combat noise resulting from surface ignition is no longer needed.

It is to be understood that any leaded gasoline fuel or any gasoline fuel containing organo-metallic antiknock additives can be utilized within the present invention. The term "leaded gasoline" is defined as a petroleum fraction boiling in the gasoline hydrocarbon range (between about 50° F. and about 450° F.) to which has been added a small amount, usually between about 0.05 and about 6.0 grams of metal per gallon, in the form of an organo-metallic antiknock agent, usually a lower alkyl antiknock composition such as tetraalkyllead, e.g., tetramethyllead, tetraethyllead, methyl triethyl lead, dimethyl diethyl lead, trimethyl ethyl lead, and various mixtures thereof. In addition to the lower alkyl lead primary antiknock additive, the gasoline can contain other organo-metallic compounds as supplemental antiknock agents. These include cyclopentadienyl nickel nitrosyl, methylcyclopentadienyl manganese tricarbonyl, and tris-(acetylacetonate) iron-III, nickel 2-hexylsalicylate, bis-(N-butyl salicylaldimine) nickel and vanadium acetylacetonate.

The invention can be used with commercial gasoline products of conventional refinery processes, i.e., catalytic cracking, catalytic reforming, alkylation and thermal cracking. Straight run gasoline from the distillation of crude oil may also be used as one of the components.

In addition to the antiknock agents, the gasoline fuel can contain scavenger compositions such as ethylene dibromide and ethylene dichloride; it may also contain corrosion inhibitors and stabilizers, such as 2,4-dimethyl-6-tertiary butyl phenol, 2,6-di-tert-butyl-4-methylphenol, and other alkyl phenols, N,N'-di-sec-butyl-p-phenylenediamine, hydroquinone, phenyl-alpha-naphthylamine, N-butyl-p-aminophenol, alpha-naphthol and the like. Moreover, the gasoline fuel composition can also contain other organic materials such as tertiary butyl acetate and various deposit modifiers.

The following are illustrative examples of the invention showing the use of specific motor gasoline fuel composition, lubricating oil composition and coating compositions according to the invention.

EXAMPLE I

A catalytic reformate containing 0.2 g. of lead/gal. as tetramethyllead and 0.1 theory of phosphorus as methyl dixylyl phosphate and a non-ash mineral lubricating oil having a viscosity of about 40 SUS at 100° F. containing .001% w. phosphorus as dimethyl xylyl phosphate are used in a spark ignition internal combustion engine having a compression ratio of 11:1 wherein the cylinder heads, piston crowns, and intake valve heads of the said engine are coated with an 8 mil thickness of zirconium oxide ($ZrO_2$), said coatings comprising at least about 85% of the combustion chamber.

EXAMPLE II

A hydrocarbon fuel mixture consisting of 60% v. straight run gasoline and 40% v. aromatics and containing 2 grams of lead in a mixture comprising the following relative weight proportions:

| | Percent w. |
|---|---|
| Tetramethyllead | 0.3 |
| Trimethyl ethyl lead | 4.3 |
| Dimethyl diethyl lead | 4.3 |
| Methyl triethyl lead | 42.2 |
| Tetraethyllead | 33.0 |

(the remainder of the mixture consisting essentially of scavenger, stabilizers and the like) and a mineral lubricating oil having a viscosity of 110 SUS at 210° F. containing .05% w. phosphorus as dimethyl xylyl phosphate are used in a spark ignition internal combustion engine having a compression ratio of 9:1, the piston crowns of which are coated with 12 mils of chromium oxide ($Cr_2O_3$), said coating comprising at least 50% of the combustion chamber.

EXAMPLE III

A catalytic reformate containing 3 grams of lead/gal. in the following mixture:

| | Percent w. |
|---|---|
| Tetramethyllead | 5.7 |
| Trimethyl ethyl lead | 23.8 |
| Dimethyl diethyl lead | 37.5 |
| Methyl triethyl lead | 26.2 |
| Tetraethyllead | 6.8 | and 2.0 theories of phosphorus as dimethyl phenyl phosphate and a non-ash mineral lubricating oil having a viscosity of about 100 SUS at 200° F. are used in a spark ignition internal combustion engine having a compression ratio of 14:1, wherein the cylinder heads, piston crowns and intake valve heads of said engine are coated with a material having a conductance from about 130 B.t.u./hr./sq. ft./° F. to about 5000 B.t.u./hr./sq. ft./° F.

EXAMPLE IV

A hydrocarbon fuel comprising 50% v. catalytically cracked gasoline ($C_5$ to 250° F.), 25% v. straight run gasoline and 25% v. catalytic reformate containing 1 gram of lead/gal. in the following mixture:

| | Percent w. |
|---|---|
| Tetramethyllead | 30.0 |
| Trimethyl ethyl lead | 42.2 |
| Dimethyl diethyl lead | 22.2 |
| Methyl triethyl lead | 5.2 |
| Tetraethyllead | 0.5 | and containing 1.0 theory of tributyl phosphate and a non-ash mineral oil SAE 10W–30 are used in a spark ignition internal combustion engine, wherein the piston crown is coated with 15 mils of cerium oxide ($CeO_2$).

EXAMPLE V

A gasoline consisting essentially of 60% v. catalytic reformate, 35% v. catalytically cracked gasoline and 5% v. butanes containing 3.1 grams of lead/gal. as TEL and 0.3 theory of phosphorus as cresyl diphenyl phosphate and a mineral lubricating oil SAE 20 are used in a spark ignition internal combustion engine having a compression ratio of 9:1 wherein the said cylinder heads, piston crowns and intake valves are coated with 6 mils of manganese oxide ($Mn_3O_4$).

EXAMPLE VI

A catalytic reformate containing 1.0 gram lead/gal. as tetraethyllead and 1.0 theory phosphorus as tricresyl phosphate and a mineral lubricating oil SAE 10–20W containing .02% w. phosphorus as trixylyl phosphate are used in a spark ignition internal combustion engine having a compression ratio of 13:1 wherein the piston crowns of said engine are coated with 10 mils of titanium oxide ($TiO_2$).

EXAMPLE VII

A catalytic reformate containing 1.0 gram lead as tetramethyllead and 1.0 theory phosphorus as tri[p-(n-propyl)-phenyl] phosphite and a mineral lubricating oil SAE 10W–30 are used in a spark ignition internal combustion engine having a compression ratio of 10:1 wherein the cylinder heads are coated with 6 mils of zirconium oxide ($ZrO_2$).

EXAMPLE VIII

A catalytic reformate containing 3 grams of lead as TEL and a non-ash mineral lubricating oil SAE 10W–30 containing .05% w. phosphorus as dimethyl cresyl phosphate are used in a spark ignition internal combustion engine having a compression ratio of 9.5:1 wherein the intake valve heads of said engine are coated with 4 mils of zirconium ortho-silicate ($ZrSiO_4$).

I claim as my invention:

1. A spark ignition, internal combustion engine for use with a gasoline fuel and crankcase lubricating oil at least one of which contains a phosphorus compound, said engine having a piston crown, intake valve and cylinder head a substantial proportion of the surfaces of which is exposed to combustion is coated with a thermal insulating material having a thermal conductance of from about 130 B.t.u./hr./sq. ft./° F. to about 5000 B.t.u./hr./sq. ft./° F.

2. A method of preventing rumble in a spark ignition internal combustion engine having a cylinder head, piston crown and intake valve comprising (1) coating a substantial proportion of the surfaces of the cylinder head, piston crown and intake valve exposed to combustion with a thermal insulating material having a thermal conductance of from about 130 B.t.u./hr./sq. ft./° F. to about 5000 B.t.u./hr./sq. ft./° F., and (2) operating said engine with gasoline and lubricating oil at least one of which gasoline and lubricating oil contains a phosphorus compound in a concentration sufficient to convert any combustion chamber deposits therein to a form having reduced tendency to catalyze combustion of carbonaceous residue.

3. In the operation of a spark ignition internal combustion engine using a gasoline containing an organo-lead antiknock agent whereby carbonaceous deposits normally accumulate on the piston crown, cylinder head and intake valve to an extent causing surface ignition and rumble, the improvement comprising inhibiting surface ignition and rumble by effecting combustion in the presence of (1) a piston crown, cylinder head and intake valve a substantial proportion of the surfaces of which exposed to combustion is coated with a thermal insulating coating having a thermal conductance from about 130 B.t.u./hr./sq. ft./° F. to about 5000 B.t.u./hr./sq. ft./° F., and (2) a quantity of phosphorus equivalent to from about 0.01 to about 2.0 theories based on the quantity of lead in the gasoline consumed therein.

4. A spark ignition, internal combustion engine for use with a gasoline fuel and a crankcase lubricating oil at least one of which contains a phosphorus compound, said engine having a substantial portion of the surfaces of the piston crown, intake valve, and cylinder head exposed to combustion, coated with a zirconium oxide insulating material having a thermal conductivity of about 7 B.t.u./hr./sq. ft./° F./in. in a thickness from about 0.5 mil to about 20 mils.

5. A spark ignition, internal combustion engine for use with a gasoline fuel and a crankcase lubricating oil at least one of which contains a phosphorus compound, said engine having a substantial portion of those surfaces of the piston crown, intake valve and cylinder head exposed to combustion coated with a ceramic insulating material having a thermal conductance from about 500 to about 1000 B.t.u./hr./sq. ft./° F.

References Cited in the file of this patent

UNITED STATES PATENTS

| | | |
|---|---|---|
| 1,820,878 | Wyckoff | Aug. 25, 1931 |
| 1,869,077 | Prentice | July 26, 1932 |